US009696470B2

(12) United States Patent
Cui

(10) Patent No.: US 9,696,470 B2
(45) Date of Patent: Jul. 4, 2017

(54) SENSING IMAGES AND LIGHT SOURCES VIA VISIBLE LIGHT FILTERS

(71) Applicant: Microsoft Technology Licensing, LLC, Redmond, WA (US)

(72) Inventor: Chengwu Cui, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/638,302

(22) Filed: Mar. 4, 2015

(65) Prior Publication Data

US 2016/0259099 A1   Sep. 8, 2016

(51) Int. Cl.
| | |
|---|---|
| *G02B 5/20* | (2006.01) |
| *G06K 9/46* | (2006.01) |
| *H04N 5/232* | (2006.01) |
| *H04N 5/369* | (2011.01) |
| *G06K 9/62* | (2006.01) |
| *H04N 5/357* | (2011.01) |
| *H04N 9/04* | (2006.01) |
| *G01J 3/36* | (2006.01) |

(Continued)

(52) U.S. Cl.
CPC ............. *G02B 5/204* (2013.01); *G01J 3/36* (2013.01); *G01J 3/505* (2013.01); *G06K 9/46* (2013.01); *G06K 9/4652* (2013.01); *G06K 9/4661* (2013.01); *G06K 9/6215* (2013.01); *H04N 5/23212* (2013.01); *H04N 5/357* (2013.01); *H04N 5/369* (2013.01); *H04N 9/045* (2013.01); *G01J 2001/4247* (2013.01); *G06K 2009/4666* (2013.01)

(58) Field of Classification Search
CPC ........ G02B 5/204; G06K 9/46; G06K 9/4652; G06K 9/4661; G06K 9/6215; H04N 5/23212; H04N 5/357; H04N 5/369; H04N 9/045

USPC ........................................................ 348/272
See application file for complete search history.

(56) References Cited

U.S. PATENT DOCUMENTS

| | | | |
|---|---|---|---|
| 5,805,213 | A | 9/1998 | Spaulding et al. |
| 6,573,932 | B1 | 6/2003 | Adams et al. |

(Continued)

FOREIGN PATENT DOCUMENTS

| | | |
|---|---|---|
| DE | 10-2007-048097 A1 | 6/2008 |
| WO | 2014/065053 A1 | 5/2014 |
| WO | 2014/087808 A1 | 6/2014 |

OTHER PUBLICATIONS

Shrestha, et al., "Simultaneous Multispectral Imaging and Illuminant Estimation using a Stereo Camera", In Proceedings of International Conference on Image and Signal Processing, Jun. 28, 2012, 11 pages.

(Continued)

*Primary Examiner* — Nhan T Tran
*Assistant Examiner* — Chan Nguyen
(74) *Attorney, Agent, or Firm* — Rainier Patents, P.S.

(57) ABSTRACT

The description relates to capturing or sensing color images of scenes and information about the type of light (e.g., light source) that illuminated the scene. One example can include an image sensor manifest as an array of pixels. This example can also include a lens configured to focus an image from a scene on the array of pixels. The array of pixels can entail first pixels that are configured to sense the image and second pixels that are configured to capture information about lighting of the scene.

20 Claims, 7 Drawing Sheets

(51) Int. Cl.
*G01J 3/50* (2006.01)
*G01J 1/42* (2006.01)

(56) References Cited

U.S. PATENT DOCUMENTS

| | | |
|---|---|---|
| 7,146,040 B2 | 12/2006 | Johannesson et al. |
| 7,375,803 B1 | 5/2008 | Bamji |
| 7,471,822 B2 | 12/2008 | Roth et al. |
| 7,973,968 B2 | 7/2011 | Shi |
| 8,049,789 B2 | 11/2011 | Innocent |
| 8,134,618 B2 | 3/2012 | Ajito et al. |
| 8,384,808 B2 | 2/2013 | Katsuda |
| 8,446,470 B2 | 5/2013 | Lu et al. |
| 8,446,497 B2 | 5/2013 | Hu |
| 8,760,561 B2 | 6/2014 | Haikin et al. |
| 8,767,100 B2 | 7/2014 | Chen et al. |
| 8,860,838 B2 | 10/2014 | Tezaur |
| 2005/0286097 A1 | 12/2005 | Hung et al. |
| 2008/0180665 A1 | 7/2008 | Redman et al. |
| 2009/0002560 A1 | 1/2009 | Barnhoefer et al. |
| 2011/0069189 A1 | 3/2011 | Venkataraman et al. |
| 2012/0087645 A1* | 4/2012 | Wu .................. H04N 5/33 396/439 |
| 2014/0078169 A1 | 3/2014 | Malka et al. |
| 2014/0125836 A1 | 5/2014 | Pieper |
| 2014/0192177 A1 | 7/2014 | Bartula et al. |
| 2014/0240467 A1 | 8/2014 | Petyushko et al. |
| 2015/0062347 A1* | 3/2015 | Jin .................. H04N 5/332 348/164 |
| 2015/0070528 A1 | 3/2015 | Kikuchi |
| 2015/0271461 A1 | 9/2015 | Hayashi |
| 2015/0281666 A1* | 10/2015 | Chen .................. H04N 9/735 348/302 |
| 2015/0311239 A1* | 10/2015 | Won .................. H01L 27/14621 257/432 |

OTHER PUBLICATIONS

Zapryanov, et al., "Automatic White Balance Algorithms for Digital Still Cameras—A Comparative Study", Retrieved on: Dec. 16, 2011, Available at: http://www.acad.bg/rismim/itc/sub/archiv/Paper3_1_2012.pdf.

International Search Report and Written Opinion mailed Jun. 15, 2016 from PCT Patent Application No. PCT/US2016/018560, 10 pages.

Response filed Jul. 19, 2016 to the International Search Report and Written Opinion mailed Jun. 15, 2016 from PCT Patent Application No. PCT/US2016/018560, 8 pages.

Second Written Opinion mailed Feb. 16, 2017 from PCT Patent Application No. PCT/US2016/018560, 6 pages.

* cited by examiner

SENSING IMAGES AND LIGHT SOURCES VIA VISIBLE LIGHT FILTERS

BACKGROUND

Colors captured in a color image of a scene can depend upon the type of light source illuminating the scene. Adjustments can be made to the colors based upon the type of light source to make the color image more pleasing to a user.

SUMMARY

The description relates to capturing or sensing color images of scenes and information about the type of light (e.g., light source or illumination source) that illuminated the scene. One example can include an image sensor manifest as an array of pixels. This example can also include a lens configured to focus an image from a scene on the array of pixels. The array of pixels can entail first pixels that are configured to capture the image and second pixels that are configured to capture information about lighting of the scene (e.g., visible light illuminating the scene).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

OVERVIEW

The description relates to cameras and more specifically to cameras that can detect information about the light illuminating a scene captured by the camera. From another perspective, the concepts relate to capturing or sensing color images of scenes and information about the type of light (e.g., light source) that illuminated the scene. Different types of light, such as natural light, incandescent light, various fluorescent lights, light emitting diode (LED) lights, etc., can influence colors of the sensed color image. Thus, a scene illuminated with fluorescent light may appear different (in a sensed color image) than the same scene illuminated with incandescent light even when captured by the same sensor. This is sometimes referred to as sensor metamerism. Knowing the type of light source can allow various adjustments to be made to the sensed color image to generate a more pleasing image (e.g., color accurate or enhanced image) for a user. The present implementations can capture information about the light source on the same image sensor that captures the image with little or no perceivable degradation of the sensed or captured image. Stated another way, the present implementations can utilize the same image sensor to sense the image and to sense information about the light source by using different filters. Thus, the image sensor can be thought of as having extended light detecting or sensing capability without significant loss in sensed color image quality and without the addition of another sensor. Thus, a single image sensor can perform both functions while maintaining essentially the same sensed image quality.

Figure 1:
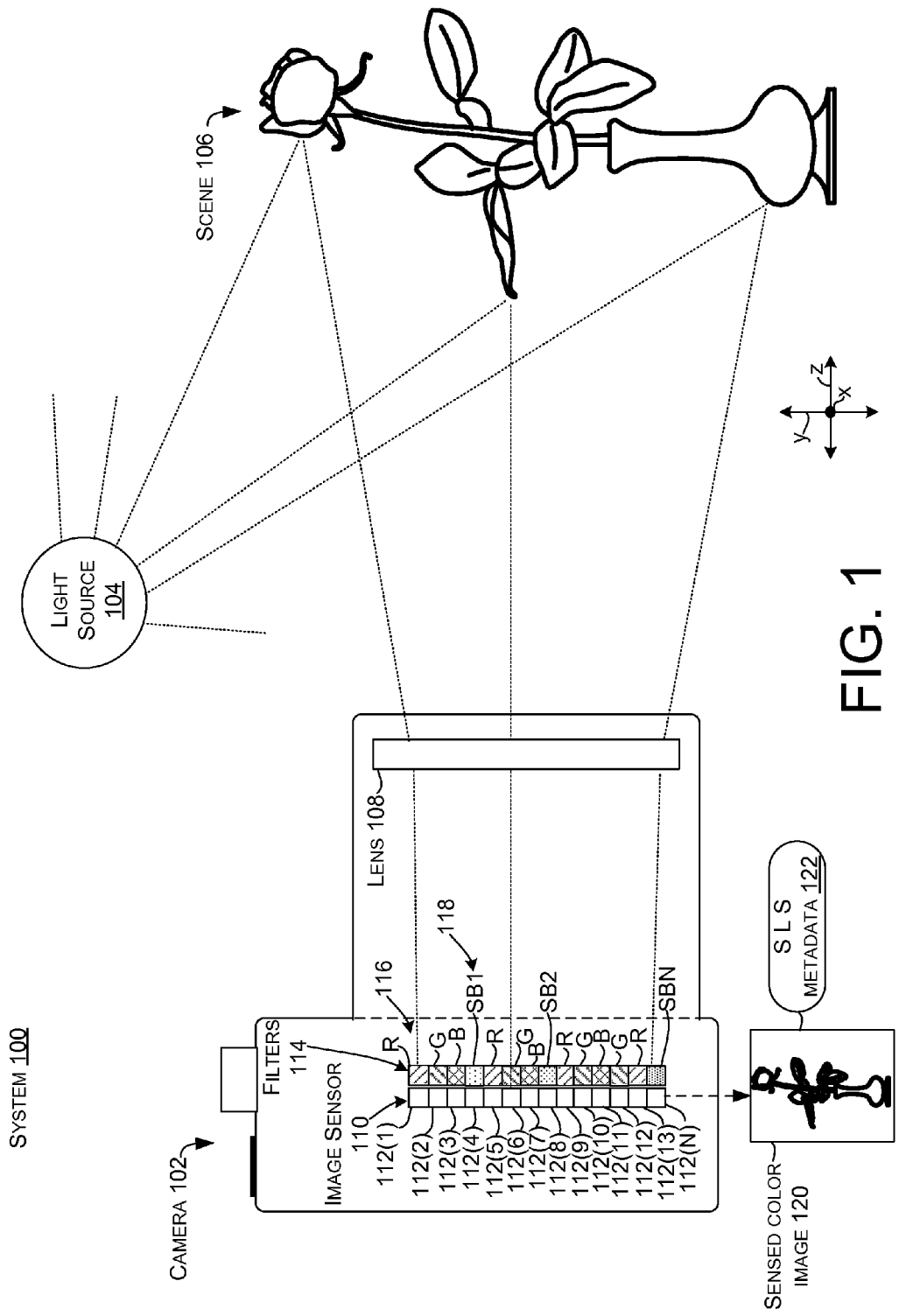
FIGS. 1 and 7 show example image and light source sensing systems in accordance with some implementations of the present concepts.

FIG. 1 shows an example spectral sensing system 100. System 100 can include a camera 102 and a light source 104 that can illuminate a scene 106. In this case, the scene is a flower in a vase. The camera can include a lens 108 and an image sensor 110. In the illustrated configuration, the camera 102 is a single-lens reflex (SLR) type camera. The present concepts are also applicable to other camera types. Cameras can capture two-dimensional or three dimensional color images. Note further, that as used herein the term 'camera' can refer to a freestanding device, such as the single-lens reflex (SLR) camera illustrated in FIG. 1 or a viewfinder camera, and/or 'camera' can refer to elements of a device (e.g., a smart phone device can include a camera). Examples of the latter scenario are illustrated and discussed relative to FIG. 7.

In FIG. 1, the image sensor 110 can include an array of sensors 112 that includes multiple individual pixel sensors 112(1)-112(N) (fourteen pixel sensors are illustrated in this example). The image sensor 110 can be an active pixel sensor, passive pixel sensor, or other type of sensor. Examples of active pixel sensors can include complementary metal-oxide-semiconductor (CMOS) sensors or charge coupled devices (CCD), among others.

Filters 114 can be positioned over individual pixel sensors 112. Note that the illustration is a simplified version of the pixel sensors 112 and filters (e.g., filter array) 114. In practice, the number of pixels in an image sensor 110 is often in the thousands or even millions, which of course cannot be effectively illustrated. However, the concepts can be effectively conveyed with this simplified version.

The filters 114 can include a first type of filter (e.g., first filter type) 116 and a second type of filter (e.g., second filter type) 118. The first type of filter 116 can be configured to aid underlying individual sensors 112 to capture a portion (e.g. a pixel) of a sensed color image 120 of the scene 106. Stated another way, the first type of filter can be thought of as a color filter so that individual underlying pixel sensors are sensitive to a specific human perceptible color, such as red, green, or blue. From one perspective, the filter transmits a color (e.g., transmits wavelengths of the color) and blocks other wavelengths. Thus, the first type of filter allows the underlying pixel sensor to sense/capture color information that contributes to the sensed color image 120. As such, the first type of filters 116 can be thought of as a color filter array. Thus, in the illustrated configuration of FIG. 1, the first type of filters 116 are color specific filters that contribute color information of the sensed color image 120. In this case, the specific colors are red (R), green (G) and blue (B). However, other implementations can use more and/or different color filters, such as clear, cyan, magenta, yellow, and/or any other color system.

The second type of filter 118 is configured to cause the underlying individual sensors 112 to capture visible spectrum information about the light source 104 rather than contributing to the sensed color image 120. The visible spectrum information about the light source 104 can be manifest as scene light source metadata 122 associated with the sensed color image 120. As used herein the term 'visible spectrum' means the human visible/perceptible spectrum (e.g., a range of electromagnetic radiation wavelengths from approximately/about 400 nanometers (nm) to approximately/about 700 nm). The term 'about' is used since not all humans are sensitive to exactly the same wavelengths and thus the 400 to 700 range generally cited is an approximation of the general population. In this context, in one example, the term 'about' can mean +/−50 nm to cover all humans at both ends of the visible spectrum.

In some implementations, the second type of filter 118 can be thought of as spectral band (SB) filters. Individual spectral band filters can sense a specific frequency/wavelength range of light that can provide information about the light source 104. The relative number of the second type of filters can be substantially less (e.g., exponentially less) than the number of the first type of filters 116. For instance, a sensor with 400,000 pixels might have 399,000 filters of the first type and 1,000 of the second type. The second type of filters can be randomly distributed among the first type of filters (or otherwise distributed in a manner that does not have a significant visual impact on the sensed image). In fact, relative to the sensed image, the pixels associated with the second type of filters can be treated as (or in a similar manner to) defective pixels. For instance, a color value for the pixels associated with the second type of filters can be determined based at least in part upon the colors of other proximate pixels, among other solutions. The determined color value can then be assigned to the pixel relative to the color image.

In some implementations, individual spectral band filters can be used cooperatively to sense the entire visible light spectrum of 400 to 700 nanometers. For instance, a first spectral band (SB1) filter could sense 400 to 450, a second spectral band (SB2) filter could sense 450 to 500 and so on with the last one (e.g., SBN) sensing 650 to 700.

The visible spectrum information from the various spectral band filters could be combined to represent the visible light spectrum of the scene when a white light field is imaged. Other implementations can use fewer spectral band filters that are selected to sense specific frequency ranges associated with individual types of light sources. For instance, incandescent light sources tend to emit light having a generally continuous profile in the visible spectrum. In contrast, other light source types, such as fluorescent bulbs, tend to emit discontinuous bands of light. Specific fluorescent bulbs tend to have distinct peaks or bands at known wavelengths. Similarly, LEDs tend to emit light in peaks that can be distinguished from the various fluorescent bulbs. The sensed visible spectrum information from these sensors alone and/or combined with the sensed color information from the sensors (underlying the first type of filter) can provide spectral information for the entire visible spectrum. In some implementations, this visible light spectrum information and/or some facet thereof) can be saved as sensed light source metadata 122. Other implementations may determine what type of light the source is and save the source type (e.g., fluorescent) as the sensed light source metadata 122.

FIG. 1 shows an implementation where each pixel of the sensor 110 has either a filter of first filter type 116 or a filter of the second filter type 118. An alternative implementation can position filters of the first filter type over all of the pixels and then position the second filter types over some or all of the first filter type. For instance, a second filter layer could be positioned over the first filter types that is transparent (e.g., clear) for most pixels, but contains the second filter type over some of the pixels such that the combination of the first filter type and the second filter type produces a specific desired transmission range.

To summarize, some implementations can embed specialized pixels in the color filter array 114 to produce unique spectral sensitivity other than the RGB filter sensitivity without significantly impacting the sensor performance.

Figure 2:
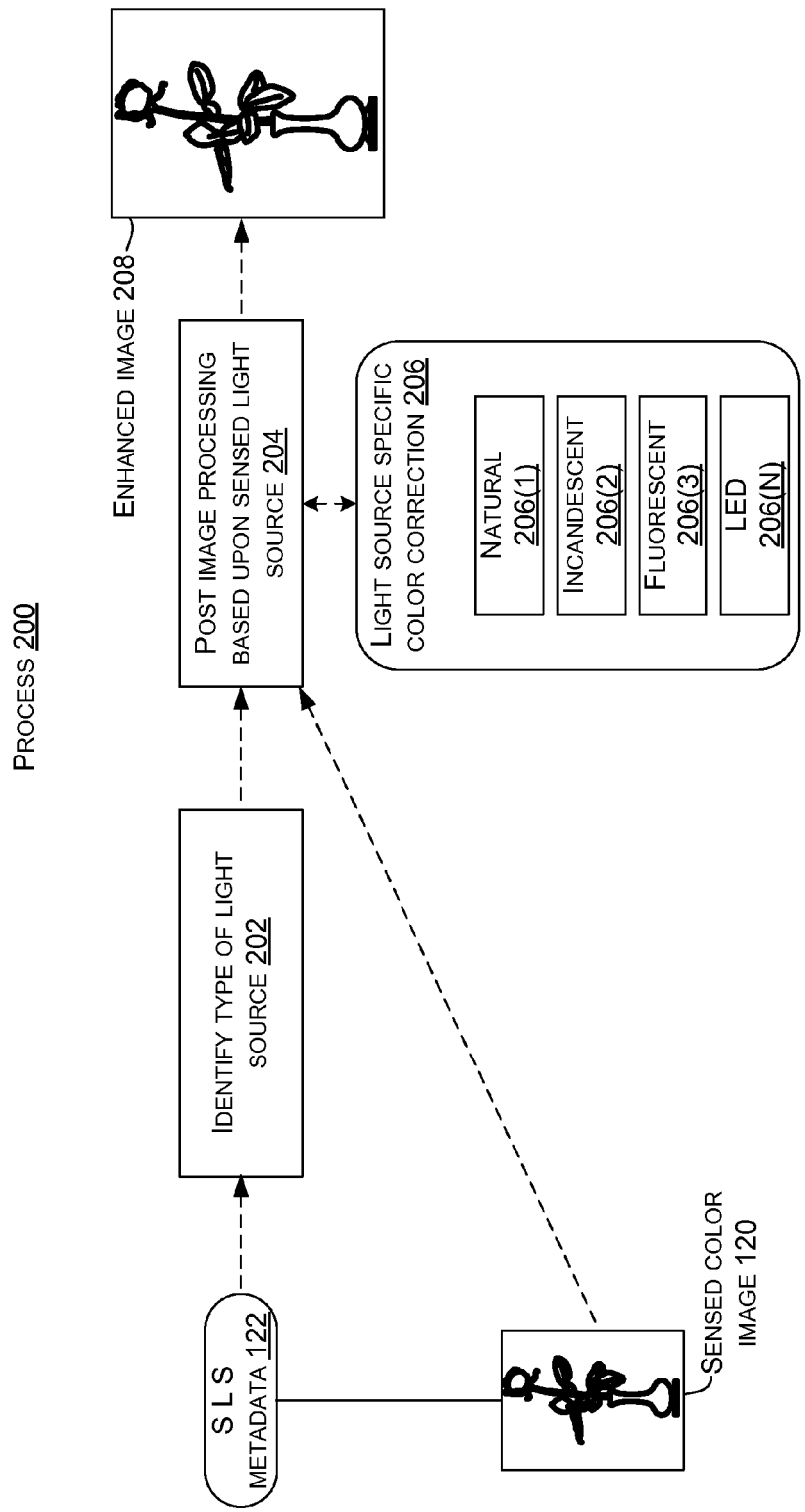
FIGS. 2, 5, and 6 show example image and light source sensing processes in accordance with some implementations of the present concepts.

FIG. 2 shows a device implemented process 200 for enhancing images. The process can operate on the sensed light source metadata 122 associated with the sensed color image 120 to determine information about the light source, such as a type of light source (e.g., illuminant type) at 202. While this discussion mentions a single type of light source, the present implementations can detect multiple types of light sources illuminating the scene and a relative intensity of each light source (e.g., the relative influence of each light source on the scene). Other implementations may treat the sensed light source type as internal parameters in the image processing pipeline hardware and/or software.

The process can perform post image processing, such as color correction on the sensed color image based upon the sensed light source information at 204. In some implementations, the post image processing can employ light source specific color correction algorithms 206 that correspond to the type of light source identified at 202. The light source specific color correction can adjust color values (e.g., intensity) from the sensed image to corresponding color values that would be expected if the image had been illuminated with neutral light. From one perspective, the light source specific color correction can be manifest as a light source specific color correction algorithm that can adjust the color values of individual color pixels (e.g., R, G, B) from the sensed values to neutral light values based upon the type of scene lighting. As used herein, 'neutral light' can be light having a pre-defined spectral profile that is objectively or subjectively pleasing to human users. The predefined spectral profile could be defined by a device manufacturer or a component supplier. Alternatively, the predefined spectral profile could be user selectable, such as from a set of neutral light options provided on the device.

In the illustrated configuration, the light source specific algorithms can include a natural light algorithm 206(1) (e.g., natural light to neutral light), an incandescent light algorithm 206(2) (e.g., incandescent light to neutral light), a fluorescent light algorithm 206(3) (e.g., fluorescent light to neutral light), and/or an LED algorithm 206(N) (e.g., LED light to neutral light), among others.

The process can produce an enhanced image 208 that compensates for the properties of the light source and is more visually appealing to the user. In contrast to previous auto white balancing techniques, the present process does not rely on estimating information about the light source from the sensed color image 120. Instead, the sensed light source information allows much more accurate and reliable auto white balancing than the previous auto white balancing estimation techniques.

Figure 3:
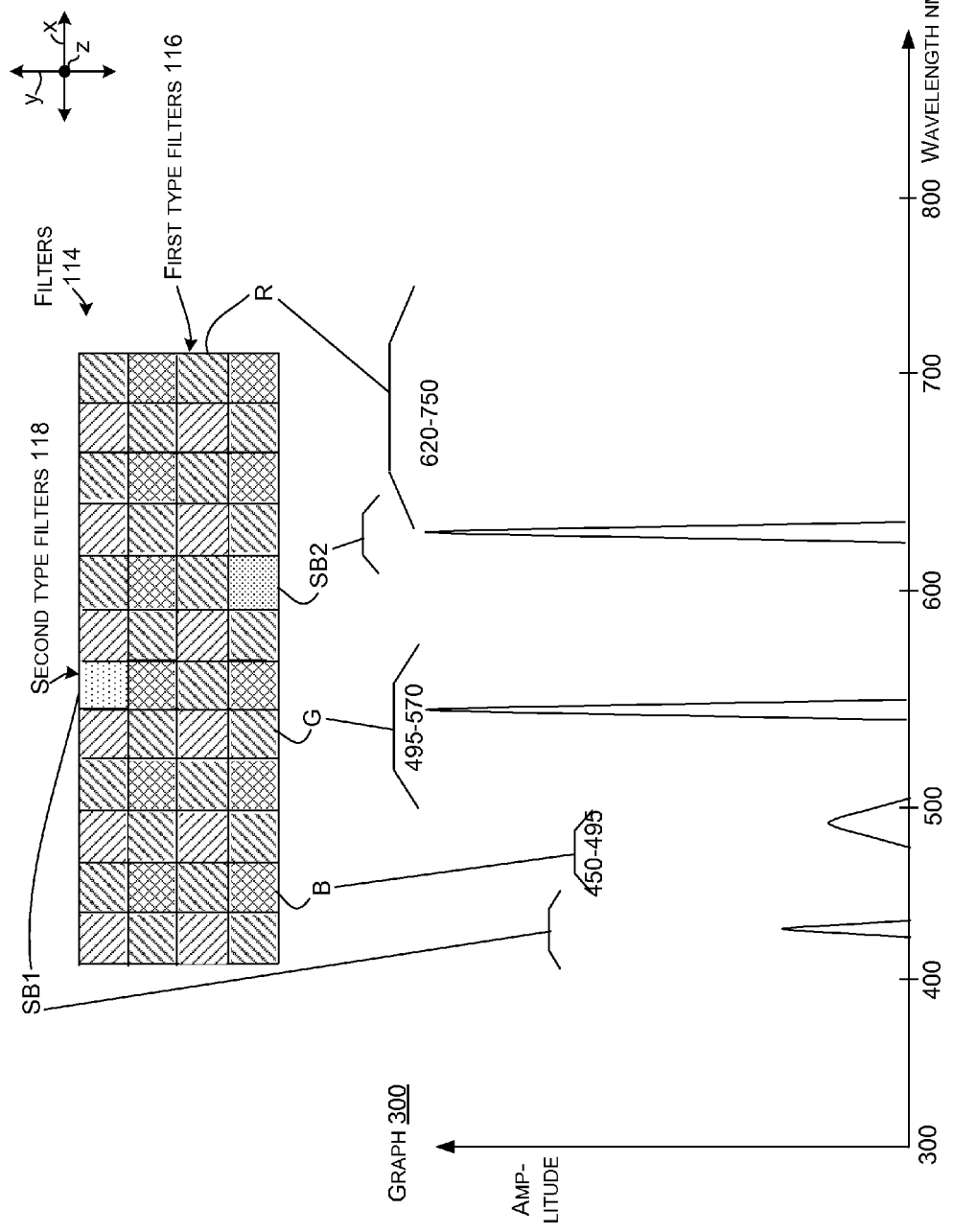
FIGS. 3-4 show example filters in accordance with some implementations of the present concepts.

FIG. 3 shows a representative portion of filters 114 where the first type of filters 116 are red (R), green (G), and blue (B) generally arranged in a Bayer arrangement (other arrangements can alternatively be used). FIG. 3 also shows a graph 300 of amplitude (e.g., intensity) and wavelength. The blue filters are configured to transmit light in the blue wavelengths (e.g., approximately 450-495 nm wavelengths). The green filters are configured to transmit light in the green wavelengths (e.g., approximately 495-570 nm wavelengths). The red filters are configured to transmit light in the red wavelengths (e.g., approximately 620-750 nm wavelengths). In this implementation, the second type of filter 118 includes SB1 and SB2 filters that are configured to detect fluorescent light. The SB1 filter is configured to detect the 400-450 nm light and the SB2 filter is configured to detect 600 to 650 nm. In practice, second type filters could be employed to detect other wavelength ranges (e.g., SB3, SB4, SBN). Further, while a single instance of the SB1 filter is shown and a single instance of the SB2 filter is shown, many implementations can employ multiple instances of each filter (e.g., multiple non-adjacent pixels having the same filter, such as a 600 to 650 nm transmissive filter).

As illustrated, fluorescent light tends to have peaks at approximately 425, 490, 540, and 620 nm. The SB1 and SB2 filters are configured to detect the 400-450 nm and 600 to 650 nm wavelengths, respectively. These wavelengths may not be readily detected through the red, green, or blue filters. Thus, selecting ranges that include these wavelengths for the SB filters can provide useful spectral information for determining a light source that is illuminating the filters 114. Stated another way, the wavelength range defined by the second type of filter 118 can be selected to be valuable for identifying specific light source types. From still another perspective, individual second type filters can be uniquely more responsive to certain light sources, such as the spectral emission lines of fluorescent lamps. Thus, the addition of the second type of filters to filter array 114 can allow fluorescent lamps to be detected and/or distinguished from other light sources, such as incandescent lights based upon specific wavelength spectral peaks.

Figure 4:
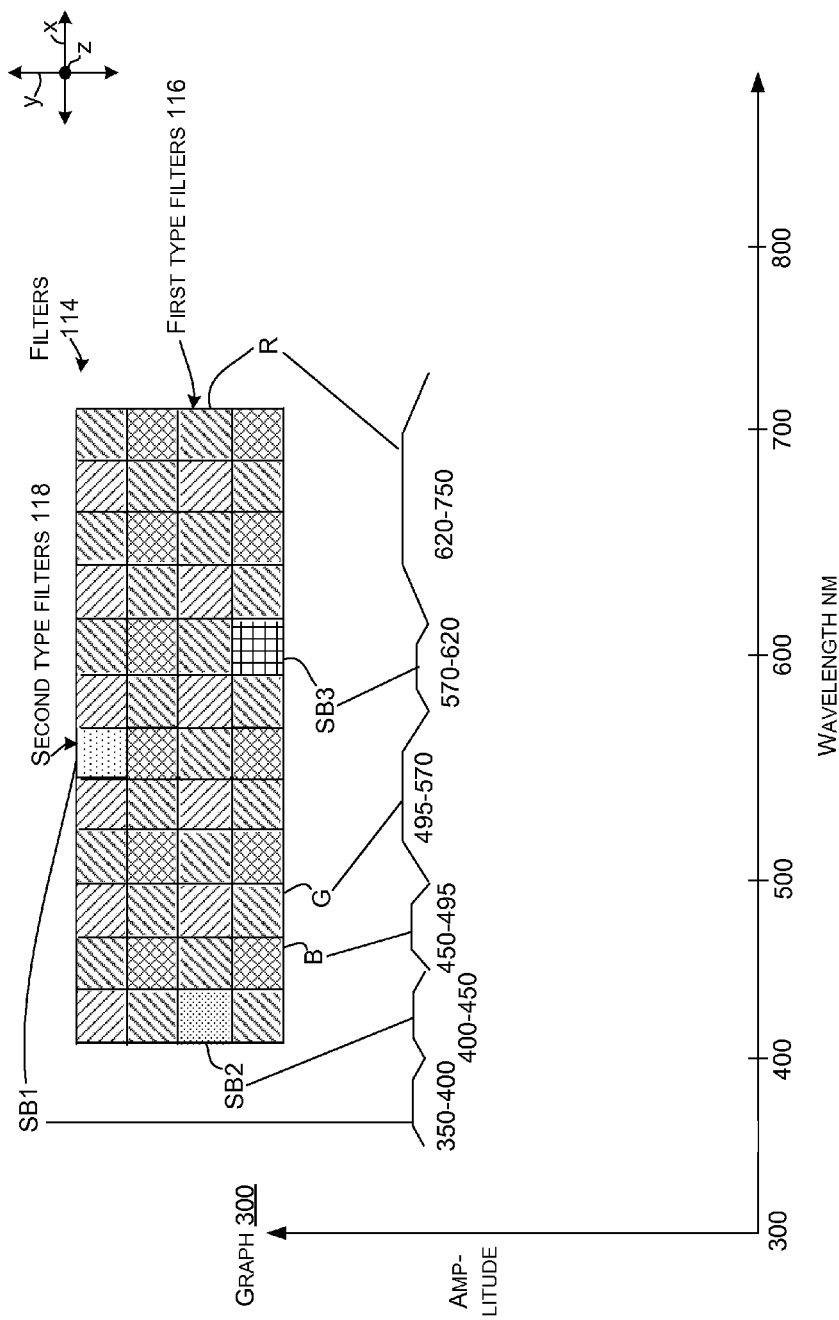

FIG. 4 shows another representative portion of filters 114 that includes three illustrated second type filters 118. For discussion purposes, FIG. 3 also shows an instance of graph 300 without a sensed spectrum shown on the graph. In this case, the second type filters SB1, SB2, and SB3 are configured to transmit light in wavelength ranges not captured by the first type filters R, G, and B. In the illustrated implementation, SB1 can transmit 350-400 and SB2 can transmit 400-450. Ranges 450-570 are captured by the blue and green color sensors. The range from 570-620 can be captured by second type filter SB3 and the range from 620-750 can be captured by the red color sensor. Stated another way, a set of second filter types could be selected that have different spectral transmission peaks that are also different from the spectral transmission peaks of the first filter type 116 (e.g., red, green, and blue). In this way, by combining information from the two filter types, the entire visible spectrum associated with a sensed image can be captured. In the illustrated implementation, the SB filter ranges do not overlap with the ranges of the color filters but are adjacent to the color filters. For instance, SB3 senses 570 to 620 nm and the red color sensor senses 620-750. However, SB3 could for example, sense from 570 nm to 650 nm and partially overlap the red color sensor. This could be valuable where determinative peaks occur at the edge of the adjacent ranges. For instance, assume that the wavelength 620 nm is strongly indicative of fluorescent lights. In such a case, having SB3 extend to 650 nm could provide effective detection of this wavelength and thereby provide more determinative results than having abutting ranges.

Still other implementations can dedicate second type filters 118 for the entire visible spectrum rather than relying upon the first type color filters 116 (and underlying sensors) for some of the spectrum information. For instance, ten consecutive 50 nm bandwidths from 300 nm to 800 nm can be captured with ten different second type filters 118 to give some overlap at each end of the visible spectrum. Alternatively, six consecutive bandwidths of fifty nanometers each can be used to span from 400-700 or five consecutive bandwidths of sixty nanometers each can be used to span from 400-700, among other configurations.

Due to physical constraints on the drawing page only 48 pixel filters are illustrated in a four by twelve array. In reality, the filters and underlying pixels can number in the thousands or millions. In relation to the second type of filters 118, filters can be selected that are specific to different wavelength ranges than the wavelength ranges illustrated here. For instance, a total of 100 filter pixels could be dedicated to sensing the visible light spectrum. These 100 filter pixels could be distributed, such as randomly distributed, over pixels of the image sensor 110. The 100 filter pixels could be divided into ten groups of ten, with each group dedicated to a particular wavelength range. The presence of these 100 pixels distributed among multiple thousands of pixels sensing the color image allows the 100 pixels to be essentially inconsequential to the quality of the sensed color image.

Figure 5:
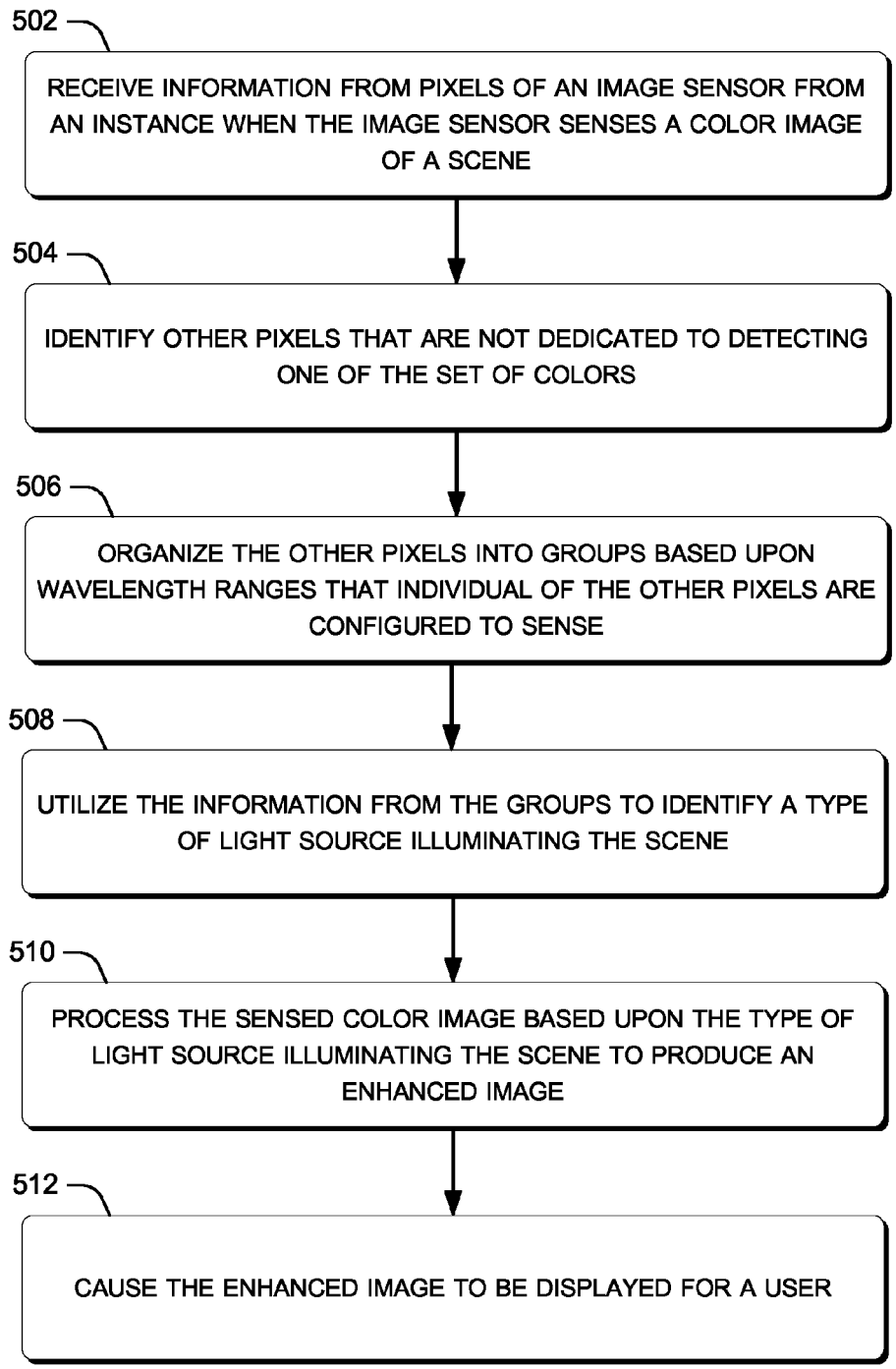

FIG. 5 shows a device implemented process 500 that can employ some of the concepts described above. Block 502 can receive information from pixels of an image sensor responsive to the image sensor sensing a color image of a scene. In some implementations, the information can include signals generated by the pixels in relation to sensing the image. The information can also include information about the locations of the pixels on the sensor, the type (and/or subtype) of filter positioned over the individual pixels (e.g., what wavelength range of visible light the individual pixel/filter combination is configured to sense, etc.).

The sensed color image of the scene can be based upon a set of colors, such as red, green, blue, or cyan, yellow, magenta, or cyan, yellow, green, magenta, among others. In the image sensor, a majority of the pixels can be configured to detect one color of the set of colors (e.g., a subset of the majority dedicated to red, another subset dedicated to green, and a third subset dedicated to blue). A minority of the pixels (e.g., some or all of the remaining pixels) can be spectral band filters that transmit other portions of the visible spectrum to different underlying pixels that do not contribute color information to the sensed color image. Instead, these pixels can be used to capture other visible spectrum information relating to illumination of the scene represented in the sensed color image.

Block 504 can identify other pixels (e.g., some or all of the remaining pixels described relative to block 502) that are not dedicated to detecting (e.g., sensing) one of the set of colors. In some configurations, the relative location of each pixel of the image sensor and the type (and sub type) of filter positioned over each pixel is known. In such implementations, the locations of the other pixels (e.g., the pixels that have the second filter type positioned over them) are known by corresponding pixel locations on the sensor and are therefore readily identified.

Block 506 can organize the other pixels into groups based upon wavelength ranges (e.g., portions of the spectrum) that individual of the other pixels are configured to sense. In some cases, the organizing the other pixels can be organizing the output of the other pixels into groups. For instance, the output (e.g. signals) of all of the other pixels sensing 350-400 nm can be grouped and the output of the all of the other pixels sensing 400-450 nm can be grouped, and so forth. In some cases, within an individual group the process can evaluate the signals from the member pixels. The signals can be digital or analog. In some cases, the signals can entail a profile (e.g., amplitude/intensity over a wavelength range).

In some implementations, the evaluating can identify pixels (e.g. pixels having outputs) that are outliers (or otherwise have reduced analytic value) and discard the outliers and evaluate remaining pixels of the group. For instance, the process may look for sharp peaks in the profile compared to the adjacent wavelengths to identify bands that are distinctive to (or indicative of) individual light sources, such as fluorescent lights. However, an individual pixel may be receiving light from a portion of the scene that is highly colored in a similar wavelength light. In such a case, the peak may be 'hidden' (e.g., the profile may have a high intensity proximate to the wavelength of the peak, such that the peak is not pronounced when evaluating the signal even though it (e.g., the peak) may be present). This pixel (e.g., the output of this pixel) may be of diminished diagnostic value compared to others in its group and may be discarded. Of course, other evaluation of the visible spectrum information provided by the pixels can be performed.

As mentioned, in some cases the evaluating can entail evaluating a spectral profile of a wavelength range of signals from individual remaining pixels of the group. In other cases, the evaluating can entail evaluating relative intensity of the signals from the individual remaining pixels at individual wavelengths.

Block 508 can utilize the information from the groups to identify a type of light source illuminating the scene. In some cases the information can be utilized collectively to generate a spectral profile of visible wavelengths illuminating the scene. The spectral profile can be generated using solely the information from the other pixels (e.g., the information from the other pixels may be sufficient to recreate the entire visible spectrum of the image and/or may capture wavelength ranges that can definitively distinguish different light types. Alternatively, this information can be utilized to detect peaks representing spectral banding without knowing the entire visible spectrum. The spectral banding can be distinctive of specific types of light sources. Stated another way, detected spectral bands at specific wavelengths can be indicative of a specific type of light source, such as a fluorescent light.

Alternatively, the information from the other pixels can be utilized in combination with other information, such as signals from the color pixels, among others. Such an example is shown in FIG. 4 where the visible light spectrum is generated using signals from the other pixels and the color pixels. The spectrum or parts thereof can be compared to spectral profiles of specific light sources. Still another implementation of block 508 is described below relative to FIG. 6.

Block 510 can process the sensed color image based upon the type of light source illuminating the scene to produce an enhanced image. The accurate light source identification offered by block 508 can allow various types of post image processing to be employed with less resources and/or more accurate correction that existing techniques. For instance, auto white balancing algorithms specific for the identified light source type can work more robustly and efficiently, which will result in higher image quality and less camera response time. One example of the processing is applying light source specific algorithms to the sensed color image. Examples of light source specific algorithms are illustrated and described relative to FIG. 2.

Block 512 can cause the enhanced image to be displayed for a user. Alternatively or additionally, the enhanced image can be stored for later use. The enhanced image may be associated with the original (e.g., raw) sensed color image, the spectral information, and/or the type of identified light source. For example, some or all of this information can be associated with the enhanced image and/or the raw image as metadata.

Figure 6:
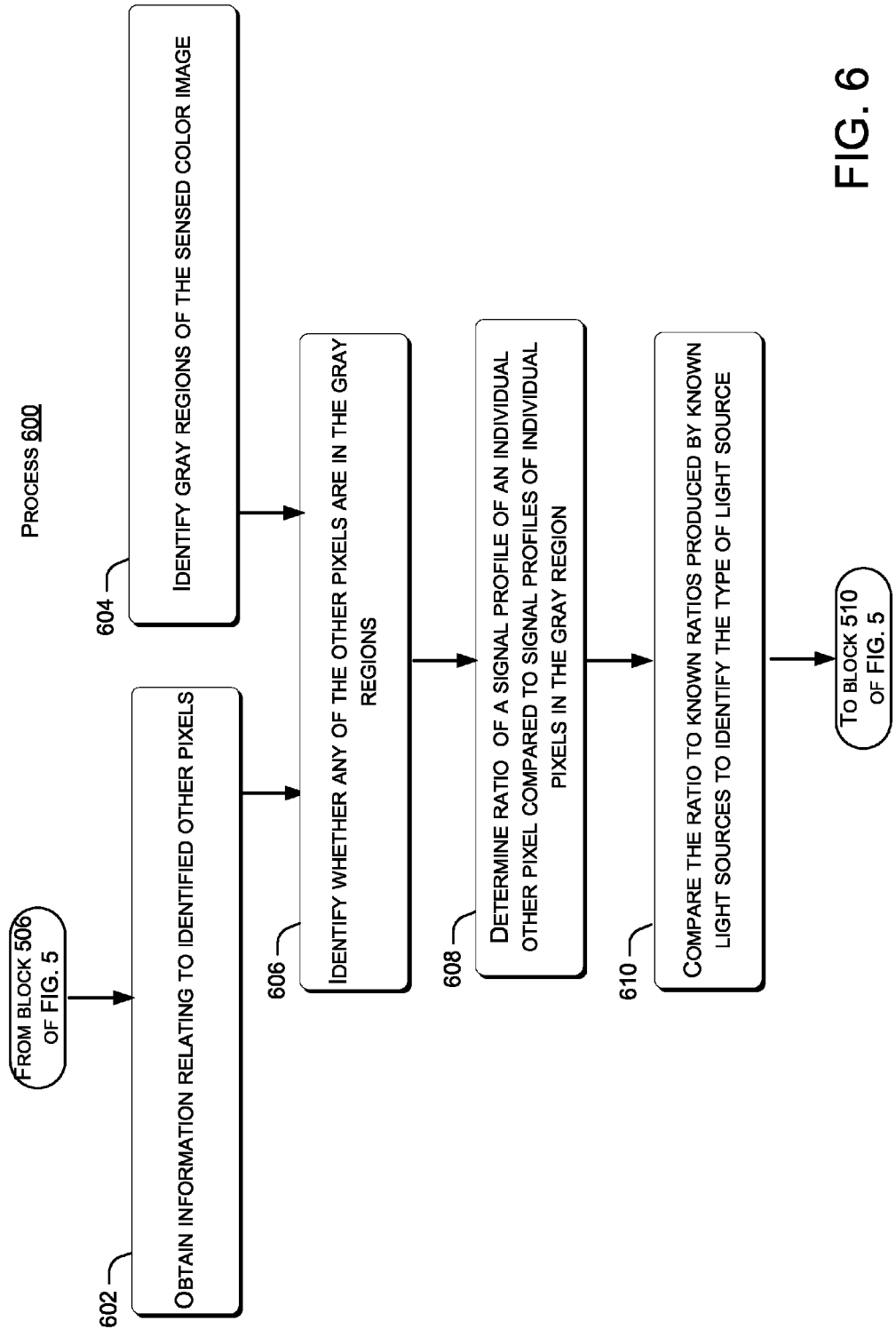

FIG. 6 shows another device implemented process 600. This process can be thought of as an additional way of accomplishing block 508 of FIG. 5. Block 602 can obtain information relating to identified other pixels (e.g., the pixels underlying the second filter type 118) from block 506 (of FIG. 5). In this implementation, block 604 can also identify gray regions of the sensed color image. Gray regions can be thought of as regions (e.g., groups of pixels) of the sensed color image that are gray or neutral colored.

Block 606 can identify whether any of the other pixels are in the gray regions. Stated another way, the gray region comprises a group of pixels at a location and the process can identify whether the group of pixels includes any of the other pixels.

Block 608 can determine a ratio of a signal profile of an individual other pixel compared to signal profiles of individual color pixels in the gray region. Stated another way, in an instance where one of the other pixels is included in the group of pixels, the process can compare a signal profile from the other pixel to signal profiles of the color pixels (e.g., the process can compare the output of the other pixel when exposed to the gray color to the output of the color sensors when exposed to the gray color). Also, the process can access a data table of stored ratios. These stored ratios can be generated under controlled conditions on an individual device, or globally, such as for an individual device model as part of the product development. The stored ratios can be obtained by capturing images of a gray surface in controlled light environments (e.g., with natural light, with incandescent light, with fluorescent light, with LED light, etc.). The ratio in each circumstance can be stored in the data table and mapped to the light source type.

Block 610 can compare the ratio from block 608 to the known ratios produced by known light sources to identify the type of light source. For instance, the ratio obtained at block 608 can be compared to the stored values to identify a potential match. For example, a similarity between the ratio and an individual stored ratio above a predefined threshold can be considered a match. The match can indicate the type of light source. Among other uses, this information about the type of light source can be output to block 510 of FIG. 5.

Figure 7:
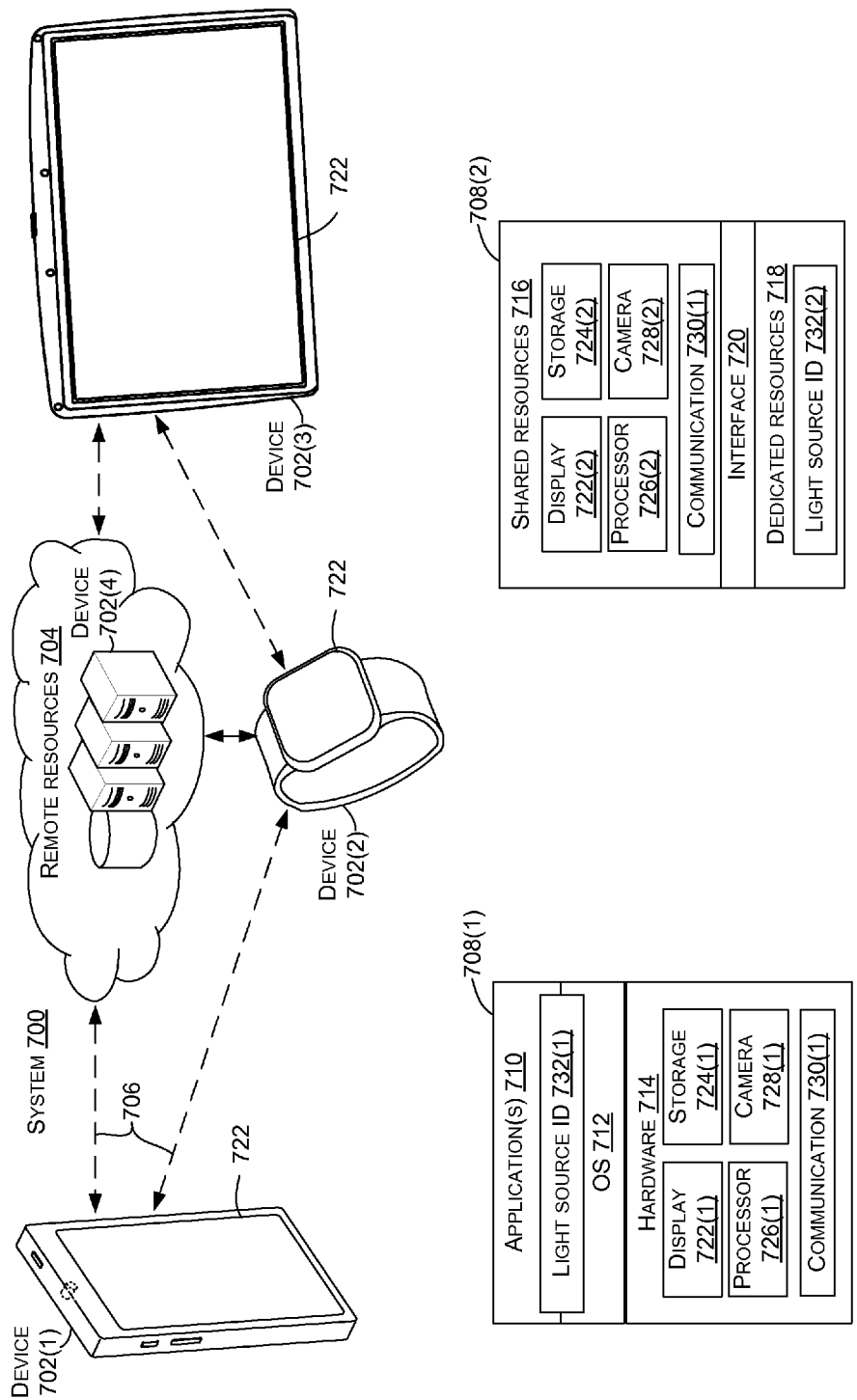

FIG. 7 illustrates an example system 700 that shows various device implementations for sensing images and light sources. In this case, four device implementations are illustrated. Device 702(1) is manifest as a smart phone, device 702(2) is manifest as wearable smart device in the form of a smart watch, device 702(3) is manifest as a tablet, and device 702(4) is manifest as a server in remote resources 704, such as cloud-based resources. Camera 102 of FIG. 1 is also another type of device 702. Devices can communicate over one or more networks 706. While specific device examples are illustrated for purposes of explanation, further examples of devices can include traditional computing devices, such as personal computers, cell phones, smart phones, personal digital assistants, wearable devices, consumer devices, gaming/entertainment consoles, vehicles, or any of a myriad of ever-evolving or yet to be developed types of devices.

Individual devices 702 can be manifest as one of two illustrated configurations 708(1) and 708(2), among others. Briefly, configuration 708(1) represents an operating system centric configuration and configuration 708(2) represents a system on a chip configuration. Configuration 708(1) is organized into one or more applications 710, operating system 712, and hardware 714. Configuration 708(2) is organized into shared resources 716, dedicated resources 718, and an interface 720 there between.

In either configuration, the devices 702 can include a display 722, storage 724, a processor 726, a camera 728, a communication component 730, and/or a light source identification (ID) component 732. Individual devices can alternatively or additionally include other elements, such as input/output devices, buses, graphics cards (e.g., graphics processing units (CPUs)), etc., which are not illustrated or discussed here for sake of brevity.

The camera 728 can include the lens 108, image sensor 110, and associated filters 114 of FIG. 1. The communication component 730 can allow individual devices 702 to communicate with one another via networks 706. The communication component can include a receiver and a transmitter and/or other radio frequency circuitry for communicating with various technologies, such as cellular, Wi-Fi (IEEE 802.xx), Bluetooth, etc.

Light source identification component 732 can be configured to receive output (information/data) from the image sensor 110 (FIG. 1). The light source identification component can identify which data is color information of the sensed color image of a scene and which data relates to spectral information of light that illuminated the scene. The light source determination component can then determine what type of light source illuminated the scene. Several processes that can be employed by the light source identification component 732 are described above relative to FIGS. 5 and 6. The light source determination component can then take actions to improve the sensed color image. An example process that can be employed by the light source determination component is described above relative to FIG. 2.

Note that not every instance of light source identification component 732 needs to provide every functionality described above and/or perform every function in every circumstance. For purposes of comparison, first consider a robust implementation, such as might be accomplished on the camera 102 of FIG. 1 or the smart phone device 702(1) of FIG. 7. In such a case, the device can capture or sense a color image, identify the type of light source based upon information from the second type filters 118 (FIG. 1), produce an enhanced image 208 (FIG. 2) based upon the type of light source, and display the enhanced image for the user. However, in a situation where the device's battery is low (e.g., below a defined threshold), the light source identification component 732 may simply store the sensed color image with the information from pixels associated with the second type filters 118 (FIG. 1). The light source identification component 732 may then perform the other actions at a subsequent time, such as when the device is plugged in to a power supply.

In an alternative configuration, the device 702 may be resource constrained and as such employ a less robust light source identification component 732 that may perform a limited functionality regarding identifying light sources and/or enhancing images. For instance, the smart watch implementation of device 702(2) may lack one or more of processing, storage, and/or power resources. In this case, the light source identification component 732 can then store and/or transmit the sensed color image and associated information from the pixels of the second filter type 118 to another device, such as device 702(4). This device 702(4) can then perform the remaining functionality to produce the enhanced image(s) 208. The enhanced images can then be stored, such as in the user's cloud storage, returned to the original device, and/or sent to another device.

From one perspective, any of devices 702 can be thought of as computers. The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

As mentioned above, configuration 708(2) can be thought of as a system on a chip (SOC) type design. In such a case, functionality provided by the device can be integrated on a single SOC or multiple coupled SOCs. One or more processors can be configured to coordinate with shared resources 716, such as memory, storage, etc., and/or one or more dedicated resources 718, such as hardware blocks configured to perform certain specific functionality. Thus, the term "processor" as used herein can also refer to central processing units (CPUs), graphical processing units (CPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

ADDITIONAL EXAMPLES

Example implementations are described above. Additional examples are described below. One example can include an image sensor comprising an array of pixels. The array of pixels can include a filter array positioned over the array of pixels. The filter array can comprise a first type of filter positioned over a majority of the pixels and a second type of filter positioned over a minority of the pixels. The first type of filter is configured to provide light filtering so that specific colors of human perceptible light are transmitted to underlying pixels and captured as color information of a sensed color image of a scene. The second type of filter comprises spectral band filters that transmit other portions of the visible spectrum to different underlying pixels that do not contribute color information to the sensed color image but capture other visible spectrum information.

Another example includes any of the above and/or below examples where the spectral band filters are selected to capture bandwidths that are indicative of specific types of light sources or wherein the spectral band filters are selected for individual ranges of bandwidths that when taken collectively cover an entirety of the visible spectrum from about 400 nanometer (nm) wavelengths to about 700 nm wavelengths.

Another example includes any of the above and/or below examples where the colors of the first type of filter are associated with transmission wavelengths that overlap transmission wavelengths of the second type of filter or wherein the transmission wavelengths of the first type of filter do not overlap transmission wavelengths of the second type of filter.

Another example includes any of the above and/or below examples further comprising a light source identification component configured to receive information from the image sensor. The light source identification component is further configured to distinguish other visible spectrum information from the color information of the received information.

Another example includes any of the above and/or below examples where the light source identification component is further configured to evaluate a profile of the other visible spectrum information to identify a light source of the scene.

Another example can receive information from pixels of an image sensor in response to the image sensor sensing a color image of a scene. The sensed color image of the scene can be based at least upon a set of colors and wherein a majority of the pixels are configured to detect one color of the set of colors. The example can identify other pixels that are not dedicated to detecting one of the set of colors. The example can organize the other pixels into groups based at least upon wavelength ranges that individual of the other pixels are configured to sense. The example can utilize the information from the groups to identify a type of light source illuminating the scene. The example can process the sensed color image based upon the type of light source illuminating the scene to produce an enhanced image. The example can cause the enhanced image to be displayed for a user.

Another example can include means for receiving information from pixels of an image sensor in response to the image sensor sensing a color image of a scene. The sensed color image of the scene based at least upon a set of colors and wherein a majority of the pixels are configured to detect one color of the set of colors. The example can include means for identifying other pixels that are not dedicated to detecting one of the set of colors. The example can include means for organizing the other pixels into groups based at least upon wavelength ranges that individual of the other pixels are configured to sense. The example can include means for utilizing the information from the groups to identify a type of light source illuminating the scene. The example can include means for processing the sensed color image based upon the type of light source illuminating the scene to produce an enhanced image. The example can include means for causing the enhanced image to be displayed for a user.

Another example includes any of the above and/or below examples where the receiving information comprises receiving signals output from the pixels.

Another example includes any of the above and/or below examples where the identifying comprises identifying the other pixels from information from the image sensor about relative locations and filter type information of individual pixels on the image sensor.

Another example includes any of the above and/or below examples where the organizing, further comprises within an individual group, identifying pixels that are outliers and discarding the outliers and evaluating remaining pixels of the group.

Another example includes any of the above and/or below examples where the evaluating comprises evaluating a spectral profile of a wavelength range of individual remaining pixels of the group, or wherein the evaluating comprises evaluating relative intensity of the information from the individual remaining pixels at individual wavelengths.

Another example includes any of the above and/or below examples where the utilizing comprises utilizing the information collectively to generate a spectral profile of visible wavelengths illuminating the scene.

Another example includes any of the above and/or below examples where the utilizing comprises utilizing the information to detect peaks representing spectral banding.

Another example includes any of the above and/or below examples further comprising utilizing a presence of the peaks at specific wavelengths to identity the light source.

Another example includes any of the above and/or below examples where the utilizing further comprises identifying gray regions of the sensed color image and identifying whether any of the other pixels are in the gray regions This example can further include determining a ratio of a signal profile of an individual other pixel compared to signal profiles of individual pixels in the gray region and comparing the ratio to known ratios produced by known light source types to identify the type of light source.

Another example includes any of the above and/or below examples where the comparing comprises accessing the known ratios in a data table and determining a similarity between the ratio and individual known ratios.

Another example includes any of the above and/or below examples where the comparing identifies a match when the similarity exceeds a predefined threshold.

Another example can include an image sensor comprising an array of pixels and a lens configured to focus an image from a scene on the array of pixels. The array of pixels can include first pixels that are configured to capture the image and second pixels that are configured to capture information about visible light of the scene.

Another example includes any of the above and/or below examples where the image sensor comprises a charge-coupled device (CCD) or a complementary metal-oxide semiconductor sensor (CMOS).

Another example includes any of the above and/or below examples manifest as a smart phone, a tablet, a wearable smart device, a single-lens reflex camera, a viewfinder camera, or a consumer device.

CONCLUSION

The described methods or processes can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

Although techniques, methods, devices, systems, etc., pertaining to imaging and light source identification are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A device, comprising:
an image sensor comprising an array of pixels;
a filter array positioned over the array of pixels;
the filter array comprising a first type of filter positioned over a majority of the pixels of the array and a second type of filter positioned over a minority of the pixels of the array, the first type of filter is configured to provide light filtering so that specific colors of human perceptible light from a visible spectrum are transmitted to underlying pixels and captured as color information of a sensed color image of a scene, and wherein the second type of filter comprises spectral band filters having spectral transmission peaks in other portions of the visible spectrum and that are configured to transmit the other portions of the visible spectrum to different underlying pixels that do not contribute color information to the sensed color image but capture other visible spectrum information; and,
a processor configured to execute computer-readable instructions comprising:
identifying gray regions of the sensed color image;
identifying whether any of the different underlying pixels are in the gray regions;
determining a ratio of a signal profile of an individual different underlying pixel compared to signal profiles of individual underlying pixels in an individual gray region; and,
comparing the ratio to known ratios produced by known light source types to identify a type of light source illuminating the scene.

2. The device of claim 1, wherein the spectral band filters have corresponding bandwidths that are indicative of specific types of light sources.

3. The device of claim 1, wherein the specific colors of the first type of filter are associated with transmission wavelengths that overlap transmission wavelengths of the second type of filter.

4. The device of claim 1, wherein the specific colors of the first type of filter are associated with transmission wavelengths that do not overlap transmission wavelengths of the second type of filter.

5. The device of claim 1, wherein the processor is further configured to:
receive information from the image sensor; and
distinguish the other visible spectrum information from the color information of the received information.

6. The device of claim 5, wherein the processor is further configured to:
evaluate a profile of the other visible spectrum information to identify the type of light source illuminating the scene.

7. A device implemented process, comprising:
receiving information from pixels of an image sensor in response to the image sensor sensing a color image of a scene, the sensed color image of the scene based at least upon a set of colors and wherein a majority of the pixels are configured to detect one color of the set of colors;
identifying other pixels that are dedicated to capturing visible light and are not dedicated to detecting one of the set of colors;
organizing the other pixels into groups based at least upon different visible wavelength ranges that the other pixels are configured to sense, wherein the organizing further comprises, within an individual group, identifying pixels that are outliers, discarding the outliers, and evaluating remaining pixels of the individual group;
utilizing the evaluated remaining pixels from the groups to identify a type of light source illuminating the scene;
processing the sensed color image based at least upon the type of light source illuminating the scene to produce an enhanced image; and,
causing the enhanced image to be displayed for a user.

8. The device implemented process of claim 7, wherein the receiving information comprises receiving signals output from the pixels.

9. The device implemented process of claim 7, wherein the identifying comprises identifying the other pixels from information from the image sensor about relative locations and filter type information of individual pixels on the image sensor.

10. The device implemented process of claim 7, wherein the organizing is performed by a processor.

11. The device implemented process of claim 7, wherein the evaluating comprises evaluating relative intensity of the information from individual remaining pixels at individual wavelengths.

12. The device implemented process of claim 7, wherein the utilizing comprises utilizing the information collectively to generate a spectral profile of visible wavelengths illuminating the scene.

13. The device implemented process of claim 7, wherein the utilizing comprises utilizing the evaluated remaining pixels to detect peaks representing spectral banding.

14. The device implemented process of claim 13, further comprising utilizing a presence of the peaks at specific wavelengths to identify the type of light source.

15. The device implemented process of claim 7, wherein the utilizing further comprises:
identifying gray regions of the sensed color image;
identifying whether any of the other pixels are in the gray regions;
determining a ratio of a signal profile of an individual other pixel compared to signal profiles of individual pixels in an individual gray region; and
comparing the ratio to known ratios produced by known light source types to identify the type of light source.

16. The device implemented process of claim 15, wherein the comparing comprises accessing the known ratios in a data table and determining a similarity between the ratio and individual known ratios.

17. The device implemented process of claim 16, wherein the comparing identifies a match when the similarity exceeds a predefined threshold.

18. A device, comprising:
an image sensor comprising an array of pixels;
first visible light filters having first spectral transmission peaks in the visible light spectrum;
second visible light filters having second spectral transmission peaks in the visible light spectrum;
a lens configured to focus an image from a scene on the array of pixels; and, the array of pixels comprising first pixels that are configured to capture the image through the first visible light filters and second pixels that are configured to capture information about visible light of the scene through the second visible light filters; and, a processor configured to organize the second pixels into groups based at least upon different visible wavelength ranges that the second pixels are configured to sense, and within an individual group, identify pixels that are outliers, discard the outliers, and evaluate remaining pixels of the individual group.

19. The device of claim 18, wherein the image sensor comprises a charge-coupled device (CCD) or a complementary metal-oxide semiconductor sensor (CMOS).

20. The device of claim 18, manifest as a smart phone, a tablet, a wearable smart device, a single-lens reflex camera, a viewfinder camera, or a consumer device.

* * * * *